(12) United States Patent
Lu et al.

(10) Patent No.: US 8,812,700 B2
(45) Date of Patent: Aug. 19, 2014

(54) METHOD AND APPARATUS FOR PROVIDING NETWORK BASED SERVICES TO NON-REGISTERING ENDPOINTS

(75) Inventors: Min Lu, Freehold, NJ (US); Martin Dolly, Forked River, NJ (US); Leticia Johnson, Helotes, TX (US); Mark Ratcliffe, Oakhurst, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

(21) Appl. No.: 12/333,776

(22) Filed: Dec. 12, 2008

(65) Prior Publication Data

US 2010/0153567 A1  Jun. 17, 2010

(51) Int. Cl.
*G06F 15/16* (2006.01)
*G06F 15/173* (2006.01)

(52) U.S. Cl.
USPC .......................... 709/229; 709/223; 709/227

(58) Field of Classification Search
CPC ............ H04L 65/1016; H04L 65/1006; H04L 65/1073; H04L 67/306; H04L 65/105; H04W 80/10

USPC ......... 709/203, 223, 225, 226, 227, 229, 230, 709/236, 238, 242–244, 245; 379/114.01, 379/127.01, 265.01, 265.09; 370/400
See application file for complete search history.

(56) References Cited

U.S. PATENT DOCUMENTS

| | | | |
|---|---|---|---|
| 2005/0175019 | A1 | 8/2005 | Kalavade et al. |
| 2007/0027975 | A1* | 2/2007 | Tai et al. ........................ 709/223 |
| 2007/0061397 | A1* | 3/2007 | Gregorat et al. .............. 709/203 |
| 2007/0071221 | A1* | 3/2007 | Allen et al. .............. 379/265.01 |
| 2007/0086582 | A1 | 4/2007 | Tai et al. |
| 2007/0088836 | A1* | 4/2007 | Tai et al. ........................ 709/227 |
| 2007/0282911 | A1* | 12/2007 | Bantukul et al. ............ 707/104.1 |
| 2010/0106846 | A1* | 4/2010 | Noldus et al. ................. 709/229 |

* cited by examiner

*Primary Examiner* — Peling Shaw
(74) *Attorney, Agent, or Firm* — Hanley, Flight & Zimmerman, LLC.

(57) ABSTRACT

Many of the current IMS standards and enriched services were originally designed for the individual subscribers that are serviced by the wireless network. However, the IMS standards do not fully address the problem of providing the IMS enriched services and features to business PBX customers or wholesale customers that do not directly register to the IMS network. The present invention discloses a method for providing IMS enriched services and features to business PBX customers or wholesale customers through the use of a static provisioning and registration method.

20 Claims, 4 Drawing Sheets

METHOD AND APPARATUS FOR PROVIDING NETWORK BASED SERVICES TO NON-REGISTERING ENDPOINTS

BACKGROUND

The IP Multimedia Subsystem (IMS) is a data network with an open and standardized architecture for converged fixed and mobile communications services. IMS enables service providers to expand their offerings to their customers by integrating voice and multimedia communications, such as video, text, images and instant messages, and delivering them into new environments. It is well known that IMS is emerging as a viable architecture that potentially may enable the convergence of various forms of communication, including voice and data, fixed and mobile services, public hot spot and enterprise WLAN, into an immersive system to provide the user with a seamless experience across various access networks.

When the IMS standard was originally designed, all subscribers needed to register with the network before they could obtain services from the IMS network. As defined in the $3^{rd}$ Generation Partnership Project (3GPP) IMS standard, service providers for the IMS network may use the Session Initiation Protocol (SIP) Public User Identity (PUID) as the identifier to recognize the subscriber. SIP is a signaling protocol, widely used for setting up and tearing down multimedia communication sessions such as voice and video calls over the Internet. A PUID enables a network to establish a route to a device that serves the subscriber. An example of information contained in a PUID may include a telephone number or a user@domain. The PUID may be contained in the P-Asserted Identity (PAI) header in SIP INVITE messages and the TO header in SIP registration messages. A SIP INVITE message indicates that the user or service is being invited to participate in a session. The body of the SIP INVITE message includes a description of the session to which the called party is being invited.

Several key issues face service providers who offer services to endpoints via the IMS network. One issue involves the identification records of a calling party. Certain types of endpoints may not have the ability to register with the IMS core network. The calling party identification, such as the originating telephone number and subscriber name, may not be preserved when a call is routed to the IMS network. An endpoint is any user device that is connected to a network. Endpoints can include, for example, a personal computer (PC), a personal digital assistant (PDA), a cellular phone, a landline telephone, a facsimile machine and an aggregate endpoint (AEP). An AEP is an endpoint that has multiple subtending users, but appears as a single SIP User Agent. Examples of aggregate endpoints are IP PBXs, enterprise Voice over Internet Protocol (VoIP) gateways, and IP trunk interfaces to other VoIP networks where end-users on those other networks are not known by the IMS. An AEP may also include customer premises equipment for business wholesale customers. The IMS standard is defined with the concept that a user is registered to the IMS core so that the user can initiate and receive calls from the network. Examples of endpoints that do not have the ability to register with the IMS network includes legacy Time Division Multiplexing (TDM) Private Branch Exchange (PBX) that access an Internet Protocol (IP) network through a VoIP gateway and routers that enable PBX equipment to access to the IMS. Endpoints that do not have the ability to register with the IMS core are referred to as non-registering endpoints (NRE).

Another challenge faced by providers who offer services to aggregate endpoints involves the PAI header. The PAI header, which contains a PUID/calling party number in the IMS network, does not have the same meaning for business and wholesale customers, as is assumed for cellular or consumer customers. Business customers often use the PAI header to signal the call-back number for the business location, but not for the device of the calling party. Wholesale calls typically identify the original calling party number in the PAI header, which identifies the originating caller rather than the wholesale provider who is known to the core service provider's IMS network.

SUMMARY

In one embodiment, data network services are provided to a non-registering endpoint. The non-registering endpoint is provisioned and statically registered onto the data network. This provisioning process enables the non-registering endpoint to receive services from the data network.

In one embodiment, multiple Serving-Call Session Control Function (S-CSCF) servers may be statically assigned to a single non-registering endpoint. Similarly, multiple Proxy-Call Session Control Function (P-CSCF) servers may be statically assigned to a single non-registering endpoint. This provides for network redundancy and for load sharing of network traffic.

In one embodiment, the P-Served-User header is utilized to identify a non-registering endpoint and to trigger originating and terminating services from the data network.

DETAILED DESCRIPTION

Figure 1:
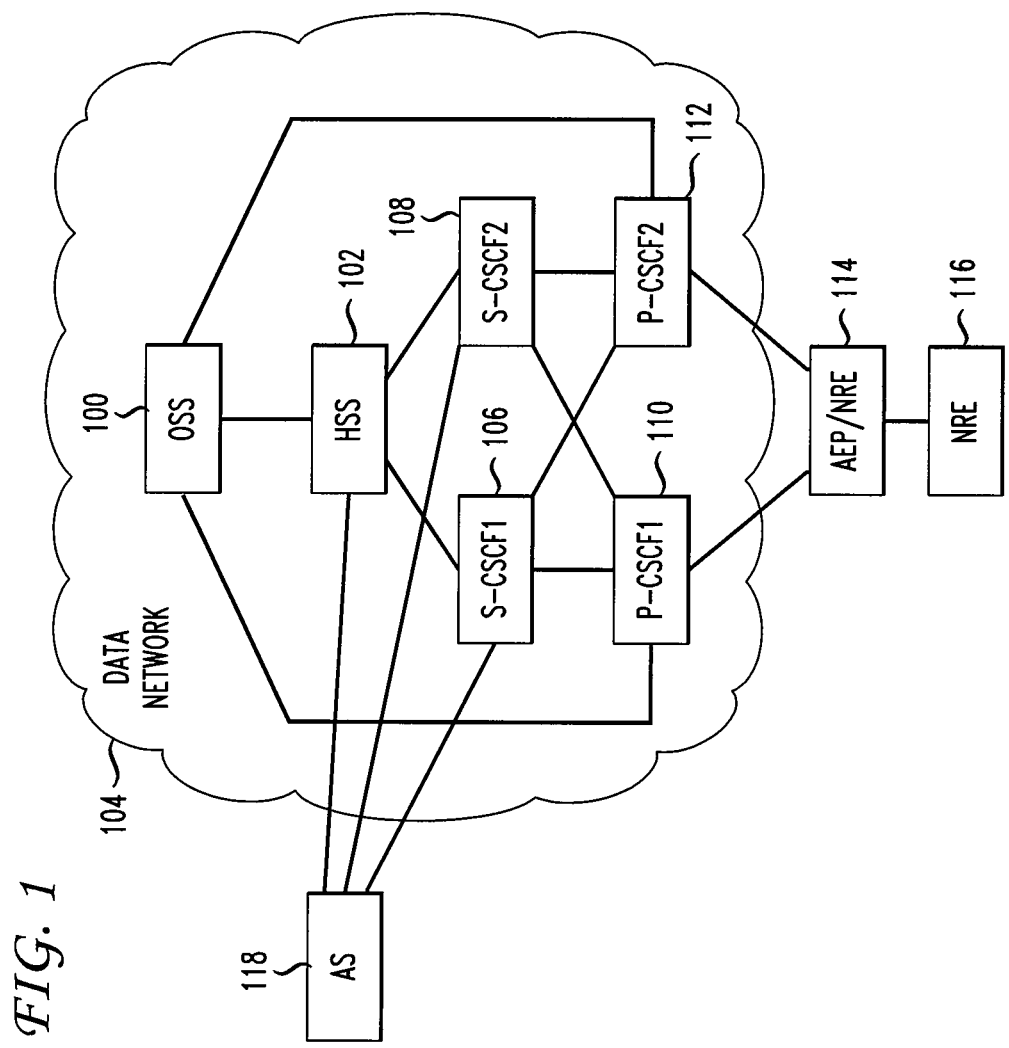
FIG. 1 is a high-level block diagram of a network in which an embodiment of the present invention may be implemented.

FIG. 1 is a high-level block diagram of a network in which an embodiment of the present invention may be implemented. The data network 104 is a packet-based Internet Protocol network that is capable of merging voice and data communication onto a single network. An example of a data network is an IMS/VoIP Core Network. The Operations Support System (OSS) module 100 provides system performance monitoring, security management, diagnostic functions, configuration and user provisioning for network elements within the data network.

The Home Subscriber Server (HSS) 102 is a database for the data network. The HSS 102 stores information such as authentication profiles and user identities for the support, establishment and maintenance of calls and sessions originated by and terminated to subscribers. The Serving-Call Session Control Function (S-CSCF) is a network element that provides session control for subscribers accessing services within the IMS network. The S-CSCF1 106 and S-CSCF2 108 have responsibility for interacting with the HSS 102.

The Proxy-Call Session Control Function (P-CSCF) is an IMS network element that forwards Session Initiation Protocol (SIP) messages from the user equipment. The P-CSCF1 110 and P-CSCF2 112 serve as the initial point of contact for the aggregate endpoint/non-registering endpoint (AEP/NRE)

114 into the data network 104. AEP/NRE 114 does not have the ability to register with the IMS network. An example of an AEP/NRE is a Time Division Multiplexing (TDM) Private Branch Exchange (PBX). A PBX is a telephone system within an enterprise that switches calls between enterprise users on local lines while allowing all users to share a certain number of external phone lines. A TDM PBX is a PBX that transmits multiple signals simultaneously over a single transmission path. The non-registering endpoint (NRE) 116 is a device that does not have the ability to register with the IMS network. The NRE 116 may be connected to AEP/NRE 114, as shown in FIG. 1. Alternatively, an NRE may directly connect to the data network. An example of a non-registering endpoint is a plain old telephone service (POTS) telephone. A POTS telephone service is the basic form of residential and small business services connection to the telephone network in most parts of the world. The application server AS 118 provides originating and/or terminating services to the endpoint. It provides services to the endpoint that is served by the S-CSCF1 106 and S-CSCF2 108. It also interfaces to the HSS 102 to get endpoint/subscriber data if necessary.

In one embodiment, a non-registering endpoint (NRE) is provisioned and statically registered onto the data network, thereby enabling data network services to be provided to the NRE. Some endpoints have the capability to register directly with the IMS core network by periodically sending a registration message from the endpoint to the network. However, NREs do not possess the ability to directly register onto the data network. The OSS 100 module provisions a static registration for the NRE in order for the NRE to receive services from the data network. A static registration occurs when OSS 100 provisions identification data of the NRE into the network. This identification data will remain in the network until it is removed, or de-registered, by OSS 100. Provisioning is the act of loading data, either by a human through a terminal or an automated operations system, into a network element to be used by the network element for its processing.

Figure 2:
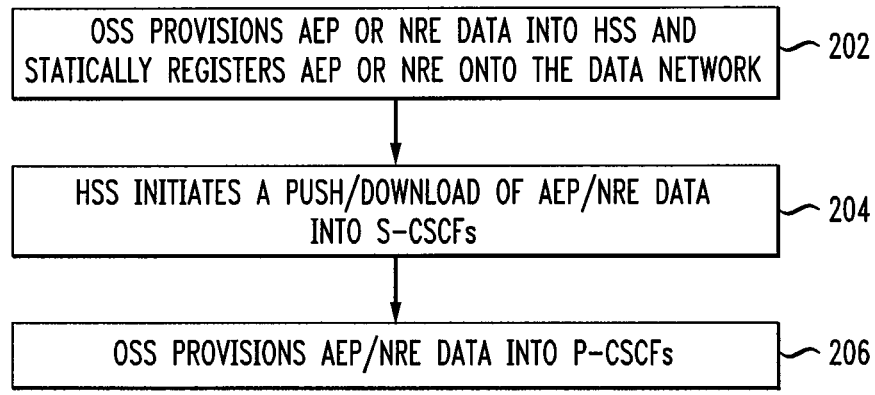
FIG. 2 is a flow chart showing the steps involved in the provisioning and registration of the non-registering endpoint onto the data network.

FIG. 2 is a flow chart showing the steps involved in the provisioning and static registration of the AEP/NRE 114 onto the data network 104 in accordance with one embodiment. As shown in step 202, the AEP/NRE 114 and/or the NRE 116 data and initial filter criteria (IFC) is provisioned and statically registered onto the data network 104. IFC includes a group of one or more trigger points and the address of application server(s) to be invoked. A trigger point describes conditions that must be checked to determine whether or not the application server should be contacted for additional service processing such as call origination or call termination services. Also in step 202, the OSS module 100 provisions the AEP/NRE 114 data onto the HSS 102. The NRE data includes P-Served-User Header information, an associated S-CSCF list and an associated P-CSCF list. The P-Served-User Header contains an identity of the NRE that is to be served by the S-CSCF. The associated S-CSCF list contains a list of multiple S-CSCF servers to be assigned to a single NRE. Similarly, the associated P-CSCF list contains a list of a multiple P-CSCF servers to be assigned to a single NRE. In the case of provisioned registration data for an AEP/NRE, the data associated with the AEP/NRE and its characteristics for processing a call are provisioned into an HSS and P-CSCF network elements.

The HSS 102 initiates a push/download of AEP/NRE 114 data at step 204 to all of the S-CSCFs on a list of multiple S-CSCF servers to be assigned to a single NRE. A push/download is an autonomous load of data that is sent from one network element to another network element. This push/download may happen immediately after the provisioning process or at a later scheduled time. The data may also be downloaded from the HSS 102 to all of the S-CSCFs on the list during the call setup stage. A push/download may be further defined by the process of the S-CSCF requesting a transfer of data from the HSS 102 to the S-CSCFs. As a result of the push/download, all of the S-CSCFs will have the AEP/NRE 114 user profile and its associated P-CSCF information. The next push/download of AEP/NRE data may occur when the AEP/NRE 114 profile is updated in the HSS 102 or when an S-CSCF is removed from the list of servers that are assigned to the NRE. The push/download of AEP/NRE data from the HSS 102 to the S-CSCFs may also occur periodically within a predetermined time period, enabled by a timing parameter. After the data is provisioned into the HSS 102, the AS 118 may also retrieve AEP/NRE 114 and/or NRE 116 data from HSS 102 during the call origination/termination procedures.

In one embodiment, the PUID for the AEP/NRE may use a wildcard for the subscriber number. A PUID may be used by any user for requesting communications to other users. Both telecom numbering and internet naming schemes may be used to address users depending on the PUID that the users have. The PUID can be in the format of a SIP URI (RFC 3261) or TEL URI (RFC 2806) format as defined in the 3GPP IMS standard. RFC 3261 and RFC 2806 are documents that specify an Internet standards track protocol for the Internet community, and requests discussion and suggestions for improvements. A PUID may include a 3 digit area code, followed by a 3 digit office code and a 4 digit subscriber number. By using a wildcard, indicating any acceptable digit for the subscriber number, the AEP/NRE may include all subscriber numbers within the 3 digit area code and the 3 digit office code. For example, if the AEP/NRE includes all subscribers having the PUID of 123-555-NNNN (where NNNN represents the subscriber number), then the PUID may use the wildcard 123-555-* (where * is the wildcard) for the AEP/NRE.

The OSS module 100 provisions the AEP/NRE 114 data onto the P-CSCFs at step 206. As a result, the AEP/NRE 114 is accessible to the P-CSCFs. The P-CSCFs are provisioned with the associated P-Served-User header information that identifies the AEP/NRE 114 and with the set of S-CSCF's that serve the AEP/NRE 114. These S-CSCFs may be identified individually or by using a Fully Qualified Domain Name (FQDN) to identify this set of S-CSCFs that serve the AEP/NRE 114. A FQDN is the complete domain name for a specific host on the internet. An example of a FQDN is www.xyzcorporation.com. The OSS module 100 may also provision the P-CSCFs with specific routing instructions to process calls from the AEP/NRE 114 to the set of S-CSCFs.

Figure 3:
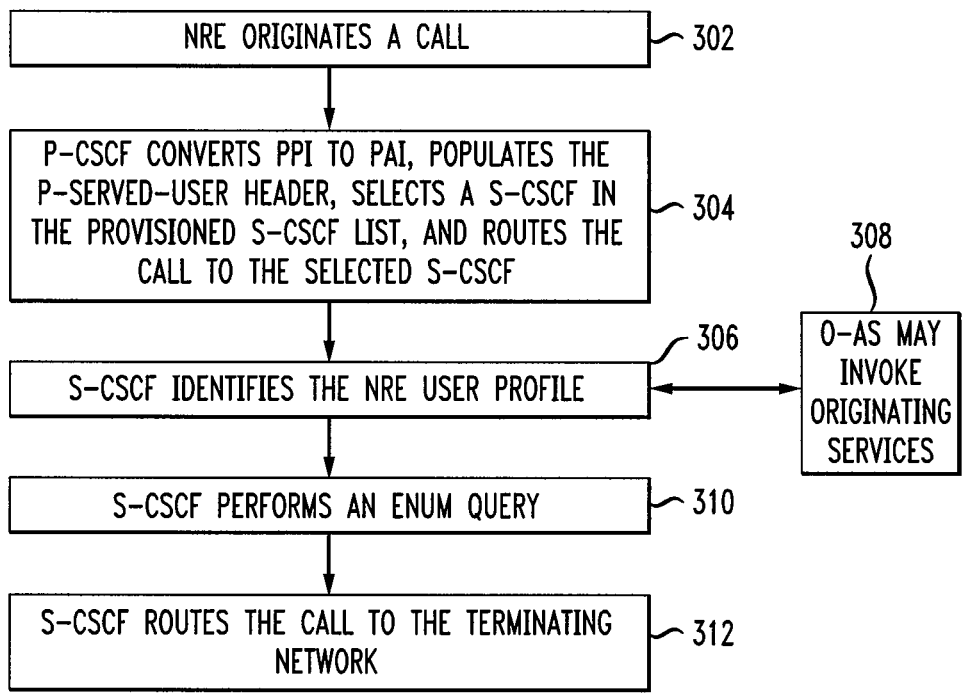
FIG. 3 is a flow chart showing the call origination from a non-registering endpoint.

FIG. 3 is a flow chart showing the call origination flow from the NRE. The NRE originates a call to the P-CSCF at step 302, with the PAI populated with the calling party number. An alternative may be to populate the P-Preferred-Identity (PPI) header with the calling party number. The PPI header is a field within the SIP INVITE message that carries the preferred identity of the calling party. The P-CSCF converts the PPI to PAI (if the PPI was populated with the calling party number), and populates the P-Served-User header to identify the NRE at step 304. The P-CSCF can reference the provisioned set, or FQDN representing the set, of S-CSCFs that serves the NRE. The P-CSCF may use an internal algorithm, such as round robin or a random generator, to select a S-CSCF from among the list of S-CSCFs and routes the call to the selected S-CSCF.

The selected S-CSCF identifies the NRE's user profile, based on the contents of the P-Served-User header in step 306. The S-CSCF may invoke originating services via an originating application server (O-AS), based on the IFC that is contained within the non-registering endpoint's user profile in step 308. After the originating processing is complete, in step 310 the S-CSCF may perform a telephone number mapping (ENUM) query to obtain the domain name of the terminating network. ENUM may be used to map a telephone number to a URI specifying a host that can be identified via Domain Name System (DNS). DNS is a system for converting host names and domain names into IP addresses on the internet. The S-CSCF routes the call to the terminating network in step 312.

Figure 4:
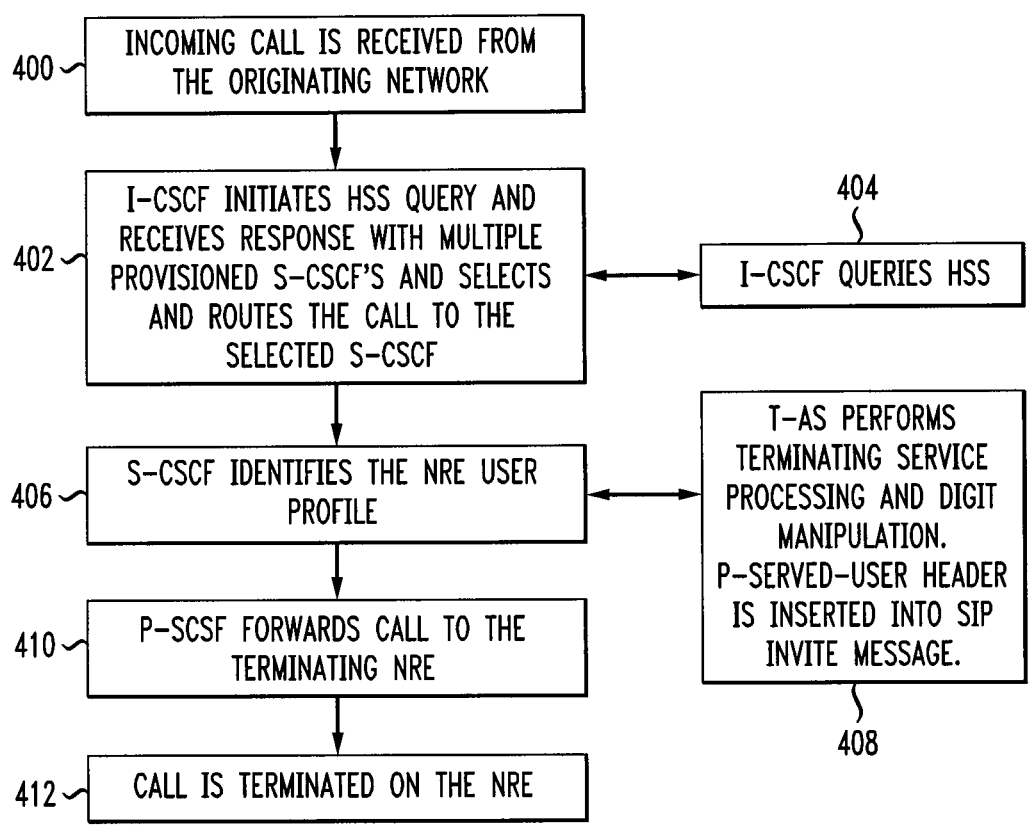
FIG. 4 is a flow chart showing the call termination flow to a non-registering endpoint.

FIG. 4 is a flow chart showing the call termination flow to the NRE. The incoming call is routed from the originating network in step 400 and reaches an interrogating CSCF (I-CSCF) in step 402. The I-CSCF, at step 404, queries the HSS. Based on the called party number, the HSS knows that the call is terminated to a statically registered NRE. The I-CSCF may use an internal algorithm, such as round robin or a random generator, to select a S-CSCF from among the list of S-CSCFs. The call is routed to the selected S-CSCF at step 406.

The selected S-CSCF, in step 408, identifies the NRE's user profile, based on the prefix/domain mapping of the called party number and may invoke terminating services via a terminating application server, based on the IFC for the terminating NRE that is defined in the S-CSCF. The IFC may include the PUID. A terminating application server (T-AS) may perform the terminating service processing and may also perform digit manipulation (DM) services. DM services encompass adding, subtracting and changing telephone numbers. The P-Served-User header may be inserted into the SIP INVITE message so that the S-CSCF can continue the same IFC processing using the PUID in the P-Served-User header when the PUID contained in the Request-URI address is changed during the DM services. A Request-URI address identifies an Internet location by the path and/or query parameters. After the terminating service processing is complete, the P-Served-User header is removed from the SIP INVITE message. The S-CSCF routes the call to the P-CSCF, based on the P-CSCF information that is defined in the downloaded user profile at step 410. The S-CSCF may use an internal algorithm, such as round robin or a random generator, to select a destination P-CSCF from among the list of P-CSCFs. The call is forwarded to the terminating NRE in step 412.

Figure 5:
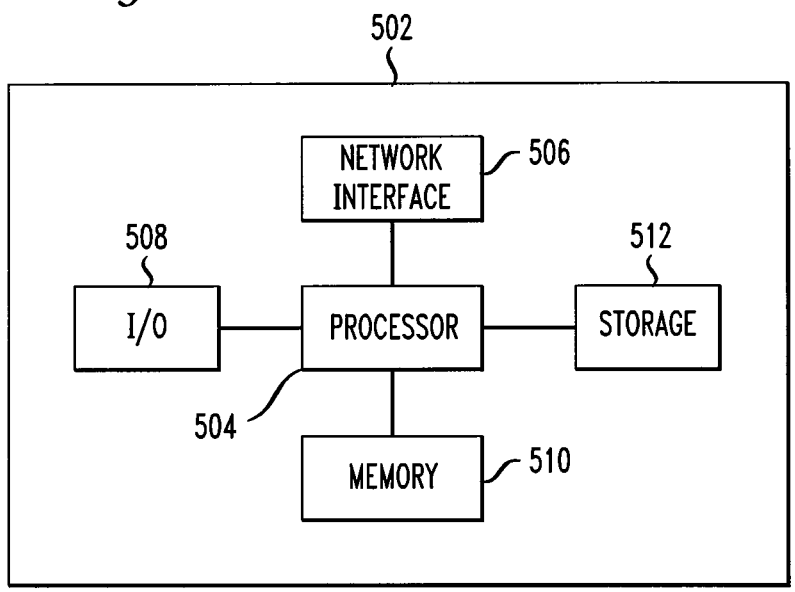
FIG. 5 is a high level block diagram of a computer.

The above-described methods and network elements may be implemented using one or more computers using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the steps of FIGS. 2-4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the steps of FIGS. 2-4. Accordingly, by executing the computer program instructions, the processor 504 executes an algorithm defined by the steps of FIGS. 2-4. The computer 502 also includes one or more network interfaces 506 for communicating with other devices via a network. The computer 502 also includes other input/output devices 508 that enable user interaction with the computer 502. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing services from a data network to a non-registering endpoint comprising:

provisioning a static registration for the non-registering endpoint by determining a user profile, a first set of proxy-call session control functions to be assigned to the non-registering endpoint and a second set of serving-call session control functions to be assigned to the non-registering endpoint, the non-registering endpoint not having the ability to register itself with an internet protocol multimedia subsystem network;

providing the user profile and a first list identifying the first set of proxy-call session control functions to multiple ones of the second set of serving-call session control functions in response to an event, the event not being a transmission of a register message from the non-registering endpoint; and providing data network services to the non-registering endpoint.

2. The method of claim 1 wherein the non-registering endpoint is one of an aggregate endpoint and a plain old telephone.

3. The method of claim 1 further comprising:

populating a P-Served-User header with an identification of the non-registering endpoint the identification of the non-registering endpoint being determined using a session initiation protocol message received from the non-registering endpoint;

selecting a first serving-call session control function from among the second set of serving-call session control functions; and routing a call associated with the session initiation protocol message to the first serving-call session control function.

4. The method of claim 3 further comprising identifying the user profile for the non-registering endpoint based on the identification of the non-registering endpoint in the session initiation protocol message.

5. The method of claim 1, further comprising:

providing an interrogating-call session control function with a second list of the second set of serving-call session control functions in response to a query;

selecting, at the interrogating-call session control function, a first serving-call session control function from among the second set of serving-call session control functions; and causing a call to be routed to the first serving-call session control function.

6. The method of claim 5, further comprising:
identifying, at the first serving-call session control function, the user profile based on one of a prefix and a domain mapping of a called party number; and
providing terminating services for the non-registering endpoint based on the user profile.

7. The method of claim 1, further comprising:
inserting a P-Served-User header that represents the non-registering endpoint into a session initiation protocol message;
selecting a first proxy-call session control function from among the first set of proxy-call session control functions; and
routing a call to the first proxy-call session control function, the first proxy-call session control function to forward the call to the non-registering endpoint.

8. The method of claim 1 wherein the event comprises (a) receipt of the user profile and the first list at the home subscriber server, (b) a scheduled time, or (c) the origination of a call by the endpoint.

9. The method of claim 1 wherein the multiple ones of the second set of service-call session control functions are to use the first list of proxy-call session control functions to process calls terminating at the non-registering endpoint until an updated first list of proxy-call session control functions is provided by the home subscriber server to the multiple ones of the second set of service-call session control functions.

10. The method claim 1 further comprising providing a second list of the second set of serving-call session control functions to multiple ones of the first set of proxy-call session control functions in response to the event.

11. The method of claim 10 wherein the multiple ones of the first set of proxy-call session control functions is to use the second list of service-call session control functions to process calls originating from the non-registering endpoint until an updated second list of service-call session control functions is provided by the home subscriber server to the multiple ones of the first set of proxy-call session control functions.

12. An apparatus for providing services from a data network to a non-registering endpoint, the apparatus comprising:
a processor; and
a memory communicatively coupled to the processor, the memory to store computer program instructions, the computer program instructions, when executed on the processor, to cause the processor to perform operations comprising:
generating provisioning data for a static registration of the non-registering endpoint, the provisioning data including a user profile, a first set of proxy-call session control functions to be assigned to the non-registering endpoint and a second set of serving-call session control functions to be assigned to the non-registering endpoint, the non-registering endpoint not having the ability to register itself with an internet protocol multimedia subsystem network;
providing the user profile and a first list identifying the first set of proxy-call session control functions to multiple ones of the second set of serving-call session control functions in response to an event, the event not being a transmission of a register message from the endpoint device; and
providing data network services to the non-registering endpoint.

13. The apparatus of claim 12 wherein the non-registering endpoint is one of an aggregate endpoint and a plain old telephone.

14. The apparatus of claim 12 further comprising:
a second processor; and
a second memory communicatively coupled to the second processor, the second memory to store second computer program instructions, the second computer program instructions, when executed on the second processor, to cause the second processor to perform second operations comprising:
populating a P-Served-User header with an identification of the non-registering endpoint, the identification of the non-registering endpoint being determined using a session initiation protocol message received from the non-registering endpoint;
selecting a first serving-call session control function from among the second set of serving-call session control functions; and
routing a call associated with the session initiation protocol message to the first serving-call session control function.

15. A computer readable storage device storing computer program instructions, which, when executed on a processor, cause the processor to perform operations comprising:
provisioning a static registration for a non-registering endpoint by determining a user profile, a first set of proxy-call session control functions to be assigned to the non-registering endpoint, the non-registering endpoint not having the ability to register itself with an internet protocol multimedia subsystem network;
providing the user profile and a first list identifying the first set of proxy-call session control functions to multiple ones of a second set of serving-call session control functions in response to an event, the event not being a transmission of a register message from the non-registering endpoint; and
providing network services to the non-registering endpoint.

16. The computer readable storage device of claim 15 wherein the non-registering endpoint is one of an aggregate endpoint and a plain old telephone.

17. The computer readable storage device of claim 15, the operations further comprising:
populating a P-Served-User header with an identification of the non-registering endpoint, the identification of the non-registering endpoint being determined using a session initiation protocol message received from the non-registering endpoint;
selecting a first serving-call session control function from among the second set of serving-call session control functions; and
routing a call associated with the session initiation protocol message to the first serving-call session control function.

18. The computer readable storage device of claim 15, the operations further comprising:
identifying the user profile for the non-registering endpoint based on an identification of the non-registering endpoint in a session initiation protocol message;
locating the user profile and an initial filter criteria associated with the user profile based on the identification of the non-registering endpoint in the session initiation protocol message; and
providing originating services to the non-registering endpoint.

19. The computer readable storage device of claim 15, wherein the operations further comprise:
providing an interrogating-call session control function with a second list of the second set of serving-call session control functions in response to a query;

selecting, at the interrogating-call session control function, a first serving-call session control function from among the second set of serving-call session control functions; and causing a call to be routed to the first serving-call session control function.

20. The computer readable storage device of claim 15, wherein the operations further comprise:

inserting a P-Served-User header that represents the non-registering endpoint into a session initiation protocol message;

selecting a first proxy-call session control function from among the first set of proxy-call session control functions; and routing a call to the first proxy-call session control function, the first proxy-call session control function to forward the call to the non-registering endpoint.

* * * * *